United States Patent [19]
Nishimura

[11] Patent Number: 5,119,748
[45] Date of Patent: Jun. 9, 1992

[54] SAILING SYSTEM EMPLOYING RADIAL FORCE SAIL

[76] Inventor: Thomas G. Nishimura, 3770 Lurline Dr., Honolulu, Hi. 96816

[21] Appl. No.: 605,850

[22] Filed: Oct. 29, 1990

Related U.S. Application Data

[63] Continuation of Ser. No. 379,252, Jul. 11, 1989, abandoned.

[51] Int. Cl.$^5$ .............................................. B63H 9/06
[52] U.S. Cl. .................................. 114/39.2; 114/103; 244/34 A
[58] Field of Search ............... 114/39.1, 39.2, 102, 114/103; 244/34 A

[56] References Cited

U.S. PATENT DOCUMENTS

| | | | |
|---|---|---|---|
| 3,987,982 | 10/1976 | Amick | 114/39.1 |
| 4,418,631 | 12/1983 | Frohbach | 114/39.2 |
| 4,677,928 | 7/1987 | Hoyt | 114/39.1 |
| 4,708,078 | 11/1987 | Legaignoux et al. | 114/102 |

FOREIGN PATENT DOCUMENTS

| | | | |
|---|---|---|---|
| 2558790 | 8/1985 | France | 114/103 |
| 2580253 | 10/1986 | France | 114/39.2 |

*Primary Examiner*—Sherman Basinger
*Attorney, Agent, or Firm*—Christensen, O'Connor, Johnson & Kindness

[57] ABSTRACT

A radial force sail (22) for propelling land or water craft includes a continuously curved anhedral section (24) having its tip portions interconnected with substantially rigid, dihedrally disposed struts (26) and (28) that converge towards each other and preferably intersect together at approximately the apex or center of curvature of the anhedral section. A manually manipulatable control bar (22) is secured to the struts (26) and (28) at their intersection with each other. Through the control bar, the sail may be rotated in the pitch, yaw and roll directions to control and quickly change the lifting and/or driving forces generated by the sail (22) substantially independently of each other or in unison.

65 Claims, 5 Drawing Sheets

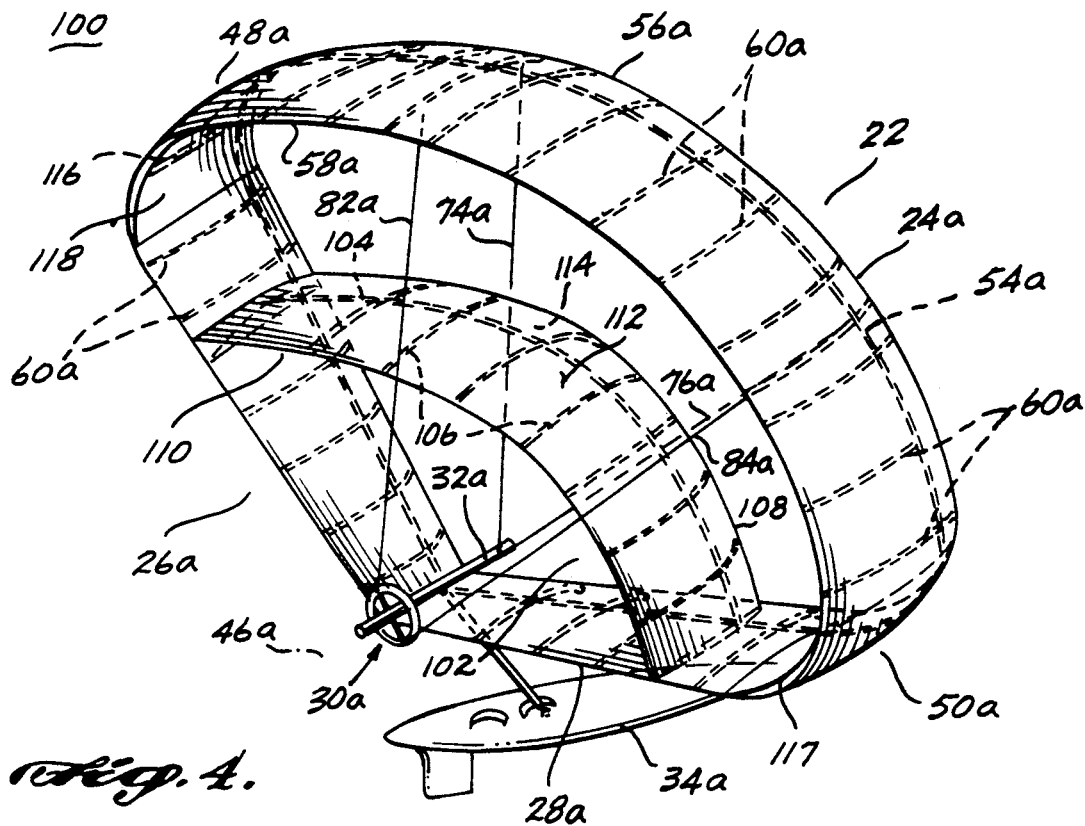
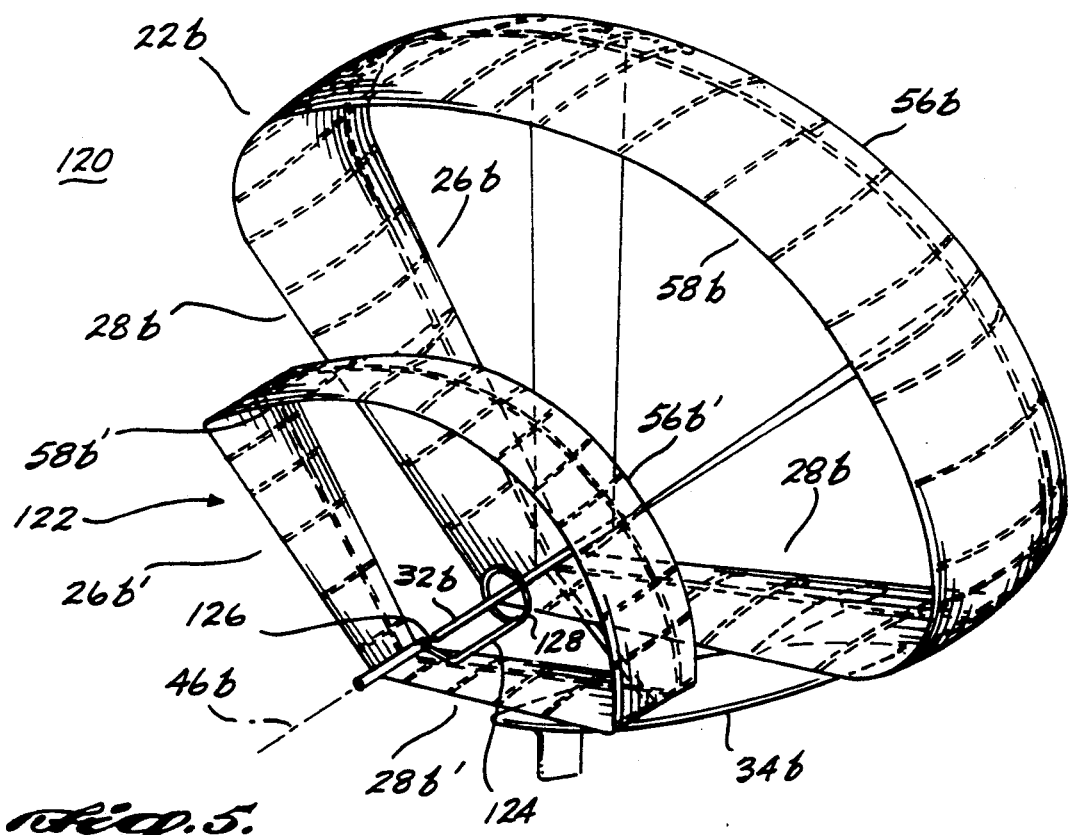

SAILING SYSTEM EMPLOYING RADIAL FORCE SAIL

CROSS REFERENCE TO RELATED APPLICATION

This is a continuation of U.S. patent application Ser. No. 07/379,252 filed Jul. 11, 1989 and now abandoned.

TECHNICAL FIELD

The present invention concerns sailing systems and in particular, a sailing system utilizing a radial force sail capable of simultaneously generating driving force and lift wherein the driving force and lift may be quickly and conveniently independently altered by the sailor.

BACKGROUND OF THE INVENTION

Traditional sailing systems, such as used on most sailboats, generate not only a driving force to propel the water craft, but also a downward component as the sail is heeled leewardly. This downward force increases the drag of the hull of the sailboat in the water. U.S. Pat. No. 4,677,928 discloses a "non-traditional" circular sail structure which also causes the watercraft to heel leewardly. The sail structure includes a circular band and an array of parallel, spaced-apart air foils extending across the circular band. The sail structure is mounted on an upright, rotatable mast capable of rotating the sail structure in the yaw direction. The sail structure may also be rotated relative to the top of the mast in the roll direction.

Other types of sailing systems are characterized by imposing a non-heeling straight-line force on the water craft. Such non-heeling sailing systems are characterized by a sail, a wing or a kite that develops the force acting along a line perpendicular to the span of the sail, wing or kite. Examples of such non-heeling systems are disclosed by U.S. Pat. Nos. 3,800,724; 3,987,982; and 4,708,078. One drawback of non-heeling sailing systems is that typically the entire sail or wing must be rolled to alter the amount of lifting force generated. The significant mass of most sails and wings does not permit this rolling operation to be carried out quickly enough to adjust to rapidly changing wave and wind conditions.

In a third type of sailing system, the sail or wing is heeled to windward to obtain an upward component of lift. Typically in this negative heeling mode, the aerodynamic lift generated is not sufficient to support the full weight of the water craft and sailor, but rather some of this weight must be supported by hydrodynamic means. A typical type of negative heeling water craft is a sailboard, for instance disclosed by U.S. Pat. No. 3,487,800; 4,501,216; and, 4,682,557. As in non-heeling systems, in negative heeling systems, including sailboards, the sail or wing for propelling the sailboard must be pivoted about its roll axis to alter the level of lifting force generated. This lifting force is beneficial in that it does produce an unweighting of the sailboard. As a result, the hull drag decreases permitting higher sailing speeds. One drawback of increasing the upward lift, however, is that the forward drive force is reduced thereby resulting in a decrease of the potential craft speed. Moreover, the time required to roll the sail or wing to vary the upward lift is significant even on a sailboard. The time response required for the rolling maneuver often is too long to adjust to changes in wind and water conditions encountered by the sailor.

SUMMARY OF THE INVENTION

The foregoing drawbacks of known sailing systems are addressed by the present invention which provides a sailing system for propelling land or water craft capable of achieving airborne flight of the craft. The sailing system includes a radial force sail having a span-wise extending anhedral section capable of generating an upward aerodynamic force in the wind and a net driving force in the wind due to the sail having both generally horizontally and vertically extending portions. Substantially rigid, generally planar struts disposed on the concave side of the anhedral section interconnect the tip portions of the anhedral section thereby contributing not only to the structural integrity, but also to the stability of the sail. Applicant has found that a sail of this shape when properly operated is capable of generating high levels of lift, often sufficient to render the craft airborne, and high levels of driving force capable of propelling the craft at significant speeds. Moreover, a sail constructed in the foregoing manner is not only light in weight, but also substantially rigid in both the convex and concave directions relative to the anhedral section so that the shape of the sail is maintained regardless of the orientation of the sail relative to the wind.

In the present application, the term "anhedral" when used with respect to the present sail shall mean a shape composed of from two to an infinite number of planes, thus encompassing sails composed of from two dihedrally disposed planes or panels to an infinite number of panels, i.e., a continuous arc. Preferably, in the anhedral section of the sail, whether formed by a span-wise continuous arc or by a plurality of substantially planar, span-wise adjacent sections, the projected aerodynamic forces acting span-wise along the anhedral section converge to a central location at or near the intersection of the struts that interconnect the tip portions of the sail anhedral section.

A control system, associated with the struts, is provided for controlling the orientation of the sail and for rotating the sail about the roll, pitch and yaw axes thereby to selectively vary the magnitudes of the upwardly directed lifting force and the propelling force generated by the sail substantially independently of each other. For smaller land and water craft, the control system includes manually graspable portions connected to the strut members. Preferably but not essentially, these manually graspable portions are disposed at or near the center of the projected aerodynamic forces which act span-wise along the anhedral portion of the sail. Further, ideally but again not essentially, the manually graspable portions of the control system are located at substantially the center of curvature of the anhedral section of the sail.

In accordance with a further aspect of the present invention, both the sail anhedral section and the strut panels in cross section define an aerodynamically efficient, three-dimensional wing profile. As such, both the anhedral section and the strut panels are capable of generating lifting forces and driving forces.

In accordance with another aspect of the present invention, stays extend between the anhedral section of the sail and the control system or the struts. The stays may be operated by the sailor to warp the adjacent portions of the leading or trailing edges of the sail anhedral section thereby to alter the angle of attack and/or camber of the sail.

In addition to operating the stays, the control system may be utilized to rotate the sail in pitch to increase or decrease the angle of attack of the horizontally disposed portion of sail thus altering the lifting force generated by the sail. Correspondingly, the sail may be pivoted in the yaw direction to alter the angle of attack of the vertically disposed portion of the sail thereby to control the level of the driving force generated. A very significant advantage of controlling the operation of the sail by making the foregoing control maneuvers is that such movement can be carried out very quickly and results in an almost instantaneous change in the angle of attack and/or camber of the sail. As a consequence, the change in the lifting and/or driving forces generated by the sail occurs immediately enough to permit the sailor to respond to the constantly changing wind and wave/terrain conditions being encountered.

BRIEF DESCRIPTION OF THE DRAWINGS

The details of typical, but not limiting, embodiments of the present invention will be described in connection with the accompanying drawings, in which:

FIG. 4 is a rear isometric view of an alternative embodiment of the present invention;

FIG. 5 is a rear isometric view of a further alternative embodiment of the present invention;

DETAILED DESCRIPTION

Figure 1:
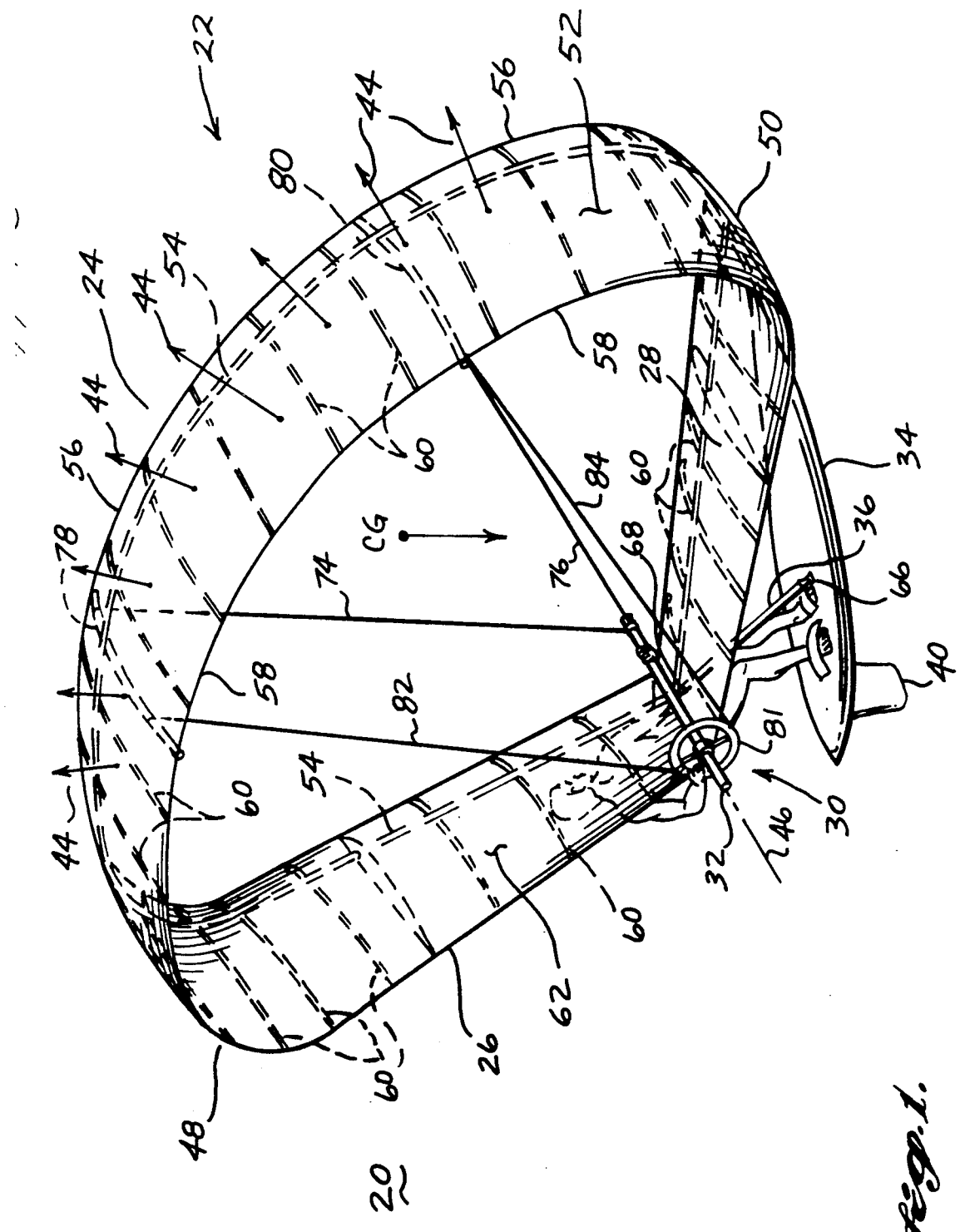
FIG. 1 is a rear isometric view of the present invention illustrating the use of the present invention in conjunction with a sailboard being sailed on a port tack.

Referring initially to FIG. 1, a sailing system 20 constructed in accordance with the present invention in basic form includes a radial force sail 22 composed of a continuously curved anhedral section 24 having its tip portions interconnected with dihedrally disposed struts 26 and 28 that converge towards each other to preferably intersect together at approximately the apex or center of curvature of the anhedral section. A control system 30 is provided for controlling the orientation of the sail 22, in part, by the manual manipulation of a control bar 32 secured to the struts 26 and 28 at their intersection with each other. The sailing system 20 is mounted on a sailboard 34 by a mast 36 pivotally attached at its ends to the sailboard and the control bar 32. As discussed more fully below, the sail 22 may be conveniently operated by the user to control and quickly alter the lifting and/or driving forces generated by the sail in unison or substantially independently of each other.

Figure 2:
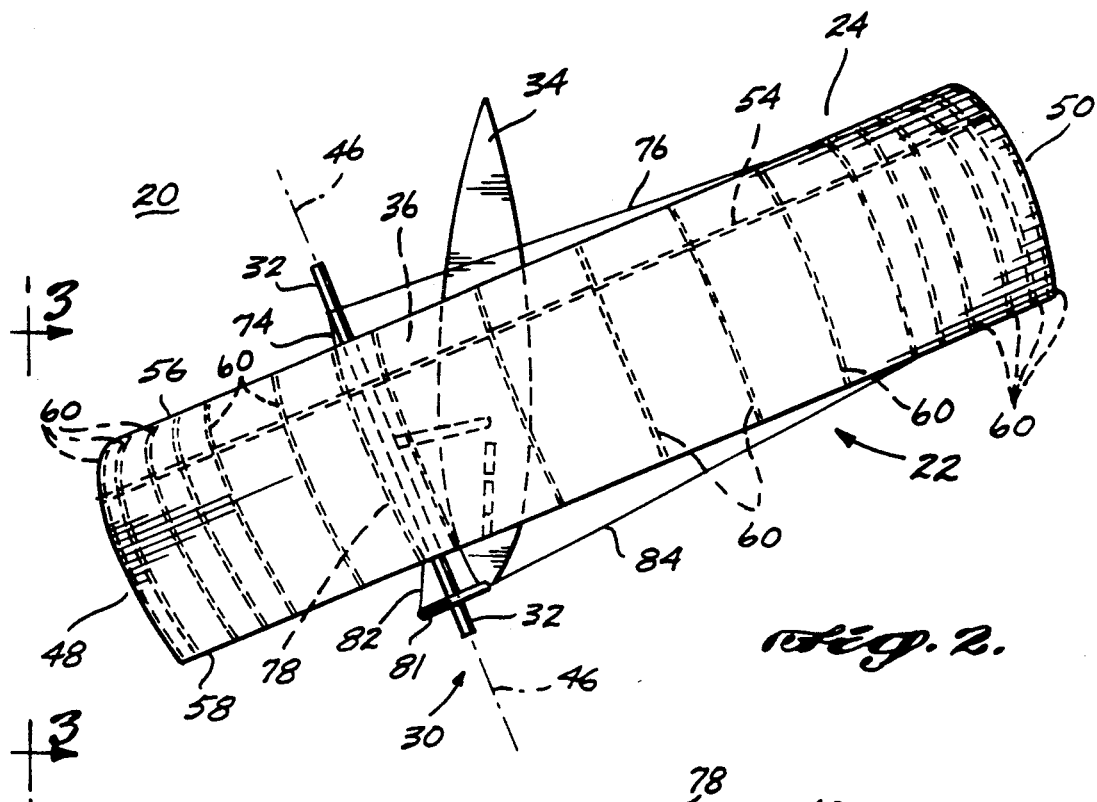
FIG. 2 is a top view of FIG. 1.
Figure 3:
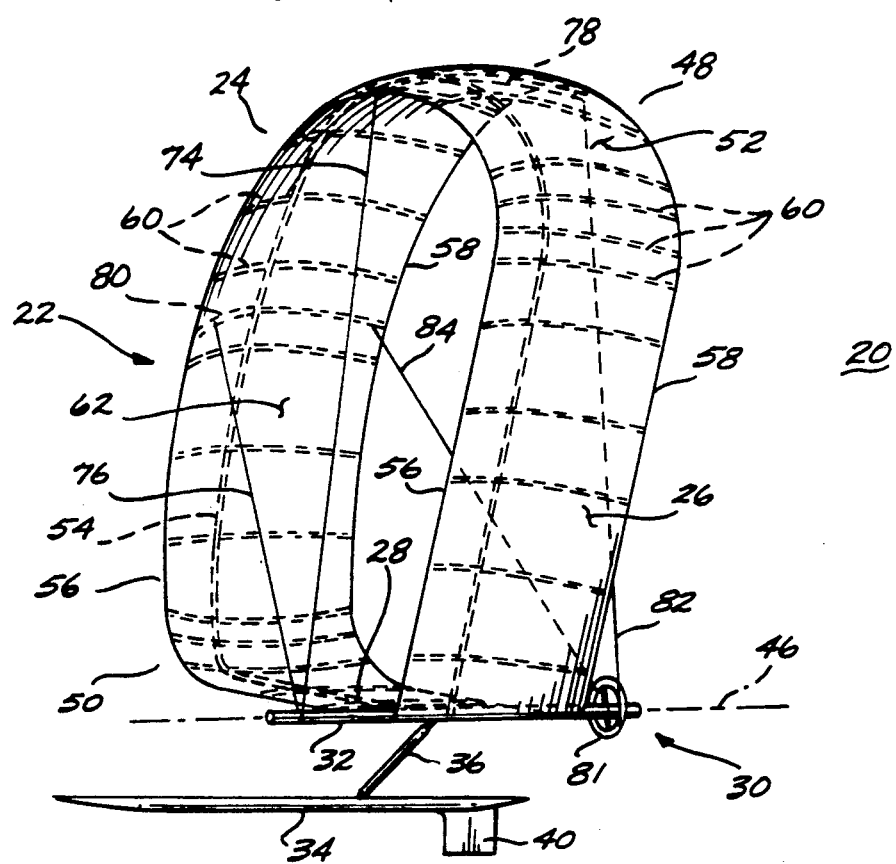
FIG. 3 is a side elevational view of FIGS. 1 and 2 taken substantially along lines 3—3 of FIG. 2.

Next describing the above aspects of the present invention in greater detail, as shown in FIGS. 1-3, the sailboard 34 is of substantially conventional construction. It includes a keel or fin 40 to provide resistance to the movement of the sailboard in the lateral direction. The sailboard need not be of sufficient size to support the sail 22 and the sailor while in static condition since the lifting force generated by the sail together with the movement of the sailboard through the water generates an upward lift on the sailboard to assist in supporting the weight of the sailor.

Although the sailing system 20 is illustrated in FIGS. 1-3 as mounted on the sailboard 34, it is to be understood that the sailing system may be used to propel other types of water craft, such as a boat, catamaran, ship, etc. In addition, the sailing system 20 may be employed to drive land based vehicles, including vehicles supported by wheels or even vehicles mounted on runners or skis, such as ice sailing boats.

Next describing the radial force sail 22 in greater detail, as shown in FIGS. 1-3, the sail includes an anhedral section 24 extending along a continuous, smooth arc. Preferably, the arc defines a portion of a circle of about 120 degrees. It is to be understood that the span-wise arc of the anhedral section may be constructed of other arc lengths, depending upon the type of vessel or vehicle desired to be propelled, the prevailing type of wind conditions under which the sailing system 20 is to be employed, whether the sail is to be controlled manually or through a motorized or automatic control system, etc. With these various factors in mind, applicants anticipate that the anhedral section 24 may extend along a span-wise arc of from approximately about 80 degrees to approximately about 180 degrees, but preferably along a span-wise arc of from approximately about 90 degrees to about 150 degrees for optimum lift and drive characteristics.

A notable characteristic of the sail anhedral section 24 is that the projected lines of action of the aerodynamic forces acting on the anhedral section of the sail at any span-wise location thereof, as depicted by arrows 44 in FIG. 1, pass radially through the apex or center of curvature 46 of the anhedral section. The importance of this feature of the radial force sail 22 will be discussed below.

Figure 6:
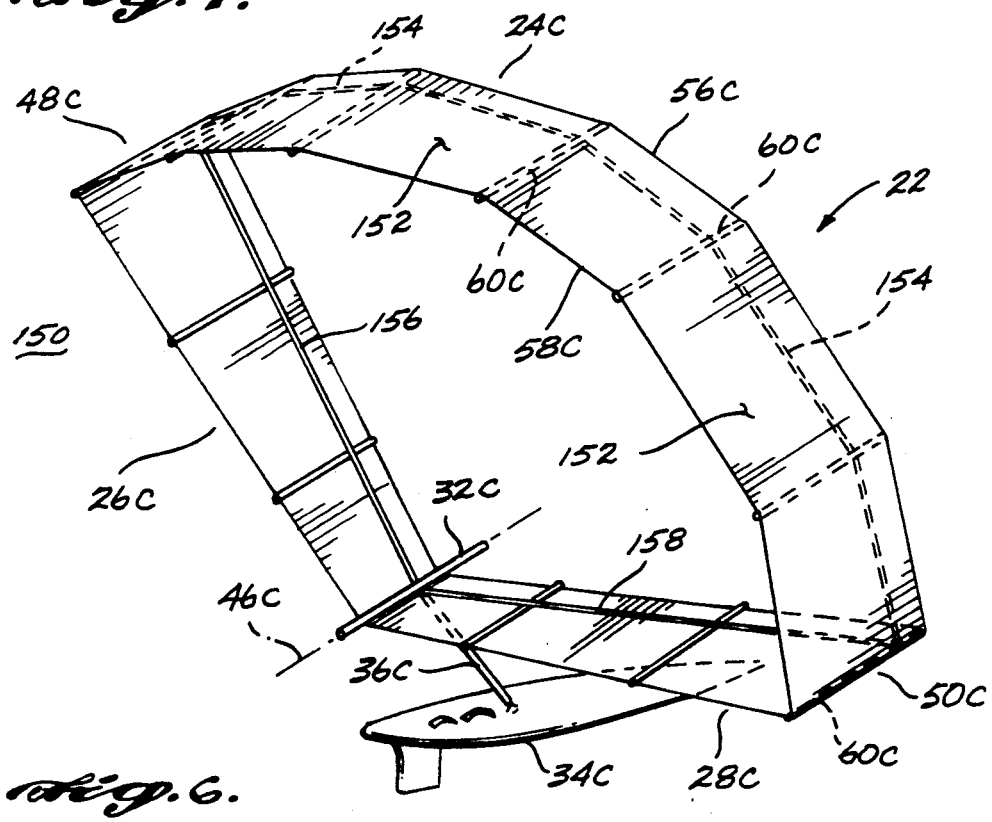
FIG. 6 is a rear isometric view of another preferred embodiment of the present invention.

Struts 26 and 28 extend radially inwardly from the tips of the sail anhedral section 24 to intersect each other at the apex 46 of the anhedral section. As shown in FIGS. 1-3, the struts 26 and 28 are generally planar, although, as described more fully below, in cross section the struts define an aerodynamically efficient airfoil shape. The outer ends of the struts 26 and 28 are joined to the adjacent tips of the anhedral section to define curved corners or junctions 48 and 50. The corners 48 and 50 define a continuous transition between the struts 26 and 28 and the anhedral section 24 of the sail 22. It is to be understood, however, that the corners 48 and 50 may be constructed in other manners, such as with a very small radius so as to form essentially sharp corners as illustrated in FIG. 6. In addition, whether the corners 48 and 50 are rounded as shown in FIGS. 1-3 or sharp as shown in FIG. 6, the corners may be defined by hinge joints so as to permit the struts 26 and 28 to be stowed in "folded" position upon disassembly from each other at their juncture at the apex 46. Such hinge joints may be composed of fabric material sewn or otherwise attached to the adjacent end portions of the struts 26 and 28 and the tips of the anhedral section 24. Alternatively, the hinge joints may be formed by numerous other standard methods, such as by a mechanical piano type hinge.

Although the struts 26 and 28 are illustrated in FIGS. 1-3 as being constructed of two separate, diagonally disposed panel structures, it is to be understood that the struts may be substantially coplanar to each other if the anhedral section 24 defines a span-wise arc of about 180 degrees. Also, the chord length of the struts may be varied along their span. For instance, it may be desirable to reduce the chord length of the struts near the control bar 32 so that the sailor can grip the control bar without an unduly wide spread of his hands.

Structurally, the anhedral section 24 and the struts 26 and 28 of the sail 22 are illustrated as being of unitary construction, composed of a fabric outer skin 52 stretched over a lightweight, but stiff, span-wise spar 54 positioned closer to the leading edge 56 rather than the trailing edge 58 of the sail 22. Ideally, but not essentially, the spar 54 is located about one-third of the way rearwardly of the sail leading edge 56. The sail leading and trailing edges are maintained in tension relative to each other by a plurality of spaced apart chord-wise disposed ribs 60 which are longitudinally arcuate to support the exterior surface of the skin 52 in a chord-wise convex shape. Although not essential, preferably the interior surface of the sail 22 is defined by an interior skin 62 extending between the sail leading and trailing edges 56 and 58. Thus, in cross section, the anhedral section 24 and the struts 26 and 28 of the sail 22 define an aerodynamically efficient, relatively low drag, cross-sectional shape.

Although the struts 26 and 28 are illustrated in FIGS. 1-3 as extending the full distance from corners 48 and 50 to the apex 46, the struts need not extend all the way to the apex 46. In this alternative design, sheets, not shown, may be employed to interconnect the leading and trailing edges 56 and 58 of the sail with the control bar 32 thereby to maintain tension on the leading and trailing edges. Also preferably the spar 54 extends the entire distance from the corners 48 and 50 to the apex 46 to form a continuous "loop". It will be appreciated that by this alternative construction, the body of the sailor may be positioned within the planes defined by the struts 26 and 28 which otherwise would be occupied by skins 52 and 62 and ribs 60, thus giving the sailor more freedom of movement and also better visibility in the direction beam-wise of the sailboard 34.

The sail 22 may be constructed in manners other than described above without departing from the spirit or scope of the present invention. For instance, in addition to spar 54, additional spars, not shown, may be used to define the leading and trailing edges 56 and 58 of the sail. In this regard, such leading and trailing edge spars, may be retained inside hems, not shown, formed along the sail leading and trailing edges 56 and 58 in a well known manner. These leading and trailing edge spars may be substantially rigid as in spar 54, or alternatively, may be more flexible so as to enable the leading and trailing edges to be flexed or temporarily warped to alter the camber and/or angle of attack of the sail, as discussed more fully below.

The sail 22 is supported on the sailboard 34 by a mast 36 interconnected between the sailboard and the control bar 32 of the control system 30. Ideally, the mast is connected to the sailboard by a universal type joint 66 and connected to the control bar 32 at a location intermediate the ends of the control bar by a similar universal type joint 68. The universal joints 66 and 68 allow the sail to be moved fore and aft and laterally relative to the sailboard 34, as well as rotated in the roll, yaw, and pitch directions relative to the length of the control bar 32. The universal joints 66 and 68 may be of numerous suitable constructions, including in the form of a ball and socket assembly or simply a flexible member composed of, for instance, flexible synthetic or natural rubber.

To accommodate sailors of different heights, and also to position the sail 22 at a nominal desired elevation above the sailboard 34, the mast 36 may be constructed from two or more relatively telescoping members, not shown.

As noted above, the control system 30 includes a control bar 32 securely affixed to the struts 26 and 28 at the intersection of the two struts. As also noted above, preferably, but not essentially, the interconnection of the two struts and thus the longitudinal axis of the control bar 32 is coincident with the intersection of the projected aerodynamic forces acting at span-wise locations along the anhedral section 24 of the sail which coincides with the apex of the arc defined by the sail anhedral section. The control bar 32 may be attached to the struts 26 and 28 by any convenient method. Ideally the ends of the control bar 32 extend forwardly beyond the leading edge 56 of the sail and rearwardly beyond the trailing edge 58 of the sail so as to enable the ends of the control bar to be conveniently manually grasped by the sailor.

Fore stays 74 and 76 interconnect the forward end of the control bar to the leading end portions of flexible or rigid control ribs 78 and 80 attached to and extending chord-wise of the anhedral section 24 of the sail. Preferably the control ribs are disposed between the outer and inner skins 52 and 62 of the anhedral section, thereby minimizing the level of aerodynamic drag created relative to the drag which would occur if the control ribs were located on the exterior surface of the anhedral section. The trailing end portions of the control ribs 78 and 80 are interconnected to a hand wheel 81, rotatably mounted on the rear end portion of the control bar 32, by sheeting stays 82 and 84. The fore stays and sheeting stays not only assist in preventing the anhedral section of the sail from unduly bowing radially outwardly relative to the longitudinal axis of the control bar 32, but also enable the sailor to change the angle of attack and/or the camber ratio of the sail as desired. It will be appreciated that by rotation of the hand wheel 81 about the control bar, the angle of attack and/or camber ratio of the anhedral section adjacent one of the control ribs may be increased and adjacent the other control rib may be simultaneously decreased.

It will be appreciated that a hand wheel 81 may be advantageously used to counteract the moment induced when increasing the angle of attack and thus the lift and driving forces generated by the sail 22 as well as by the struts 26 and 28.

Although not illustrated, it is to be understood that a hand wheel similar to hand wheel 81 may be mounted on the forward end of the control bar 32 to facilitate the operation of the fore stays 74 and 76. Alternatively, a hand wheel similar to hand wheel 81 may be mounted on both ends of the control bar. However, preferably, if two hand wheels are employed, one of the hand wheels is anti-rotationally mounted on the control bar to enable the control bar to be readily rotated about its longitudinal axis when desiring to rotate the sail 22 about its roll axis, i.e., apex 46.

Next discussing the operation of the sailing system 20 of the present invention, it will be appreciated that when the sail is oriented on a port tack as shown in FIGS. 1-3, span-wise along the anhedral section 24 of the sail from the strut 26 towards the strut 28, the sail transitions from a generally horizontal attitude to a generally vertical attitude. Correspondingly, the vertical lifting force generated by the sail decreases whereas the driving force generated by the sail increases. (The converse is true if the sail is rolled about the apex 46 into a starboard tack position). As a result, the magnitudes of the lifting and driving forces may be quickly and conveniently simultaneously increased or decreased substantially independently of each other. The lifting force may be increased by operating the fore stay 74 and sheeting stay 82 to alter the angle of attack and/or camber ratio of sail anhedral section adjacent the control rib 78. Moreover, the control bar 32 may be rotated in the pitch direction to increase or decrease the angle of attack of the section of the sail adjacent the control rib 78.

It will be appreciated that the strut 28 also functions to generate a lifting force which lifting force varies as the pitch angle of the sail is changed through the manipulation of the control bar 32. The lifting force generated by the strut 28 is important in that when the sail 22 is oriented as shown in FIGS. 1-3, the center of gravity CG of the sail 22 is located to the right hand side of rather than vertically aligned with the control bar 32, and thus, the weight of the sail generates a torque load about the longitudinal axis of the control bar tending to rotate the sail in the clockwise direction shown in FIG. 1. This torque load is counteracted, at least in part, by the vertical lifting load generated by the strut 28 during sailing.

In a manner similar to controlling the lifting forces generated by the sail 22, the drive force generated by the sail may be controlled by the sailor. This can be accomplished, for instance, by operating the fore stay 76 and the sheeting stay 84 to temporarily warp the sail adjacent the control rib 80 to thereby alter the angle of attack and/or the camber ratio of the adjacent portion of the sail. The tension on the fore stay 76 and the sheeting stay 84 may be changed by manually pivoting the control bar about an axis extending generally normally to the plane defined by the fore stay 76 and sheeting stay 84. The driving force generated by the sail 22 may also be altered by rotating the sail about a yaw axis thereby changing the angle of attack of the sail adjacent the strut 28 without significantly changing the angle of attack of the sail adjacent the strut 26.

An advantage of controlling the operation of the sail 20 by making the foregoing control maneuvers is that such movement of the control bar 32 can be carried out substantially immediately and results in almost an instantaneous change in the angle of attack and/or camber of the sail. As a consequence, the change in the lift and/or drive forces generated by the sail occurs quickly enough to permit the sailor to respond to the constantly changing wind and wave conditions being encountered.

Another manner of altering the lifting and driving forces produced by the sail 20 is by rolling the sail about the apex 46, i.e., about the longitudinal axis of the control bar 32. This maneuver typically requires the movement of more of the mass of the sail and through a greater distance than the maneuvers discussed above concerning changing the angle of attack and/or camber ratio of the sail. Nonetheless, the rolling maneuver can be accomplished quite easily by the sailor due to the relatively lightweight and the rigidity of the sail, including the struts 26 and 28. By constructing the sail 20 as described above, including with an arcuate anhedral section 24 and struts 26 and 28, the sail is substantially rigid in the direction of the arrows 44 (convex) shown in FIG. 1 and also in the reverse (concave) direction. As such, the sail 20 substantially maintains its shape regardless of the orientation of the sail and the maneuvers being conducted by the sailor, including rolling of the sail.

The maximum lift is generated by the sail when rolled about the control bar 32 to an orientation in which the struts 26 and 28 are disposed at corresponding angles relative to the horizontal. This would require rotation of the sail 22 shown in FIG. 1 in the counterclockwise direction about the longitudinal axis of the control bar 32. It will be appreciated that achieving this "full vertical lift position" of the sail is facilitated by increasing the rake of the leading edge of the sail, for instance, by pitching the sail in the rearward direction, which results in a greater lifting force generated by the strut 28 which in turn produces a counterclockwise moment load about the longitudinal axis of the control bar 32. In addition, rotation of the sail 22 in the yaw direction will also facilitate the roll movement of the sail about the longitudinal axis of the control bar 32. For instance, using the control bar to yaw the leading edge of the sail towards the sailor shown in FIG. 1, imparts a negative wind incidence on the strut 26 causing a downward or reduced force to be imposed on the strut, thus generating a torque load acting about the control bar 32 tending to rotate the sail in a counterclockwise direction from that shown in FIG. 1 so as to position the sail 22 in orientation to achieve increased vertical lift.

It will be appreciated that yawing the sail in the opposite direction will induce a torque load about the control bar 32 in the opposite direction thereby tending to rotate the sail 22 in the clockwise direction to cause the sail to generate a greater driving force. Once the desired orientation of the sail is achieved, further clockwise rotation of the sail about the axis 46 is resisted by manually restraining the control bar against further yawing. Also, though more difficult to achieve, the control bar could be restrained against further rotation about its longitudinal axis. The sailor may be assisted in this regard if a hand wheel similar, for instance, to the hand wheel 81 is fixedly secured to the control bar so the sailor can grip the hand wheel at a location that is offset from the apex 46.

It will be appreciated that the ability to conveniently and quickly vary the lifting and driving forces generated by the sailing system 20 substantially independently of each other is in part due to the anhedral shape of the sail 22. Through this shape, various sections of the sail are designed to generate lifting forces rather than driving forces and vice versa. Also, the use of the struts 26 and 28 as "flight" surfaces is of benefit. Further, by shaping the anhedral section 24 of the sail so that the lines of action of the forces acting on any spanwise portion thereof pass through the center radius of the sail which is located at the control bar facilitates the manual control of the desired orientation of the sail; such radial forces do not tend to generate large torque loads about the control bar which otherwise would make it difficult for the sailor to restrain the tendency of the sail to rotate about the longitudinal axis of the control bar. If the anhedral section of the sail were shaped so that the lines of action of the radial force components did not pass through a common point (corresponding to the location of the control bar), substantial torque loads would be generated tending to rotate the sail about the control bar. As a result, it could be not only difficult, but also very tiring for the sailor to restrain the sail 22 against rolling, especially when wave jumping or when otherwise airborne since the resisting force applied to the control bar by the sailor is primarily through the sailor's hands and arms and not by his legs.

The sailing system 20 is illustrated in FIGS. 1-3 as propelling the sailboard 34 along a port tack. The sailboard is brought about to a starboard tack by rotating the sail 22 about the control bar 32 in the counterclockwise direction from the position shown in FIG. 1 so that the strut 26 is disposed in a substantially horizontal plane analogous to the manner in which the strut 28 is horizontally positioned in FIGS. 1-3. Correspondingly, the strut 28 is disposed in an upright orientation corresponding to the orientation of strut 26 shown in FIGS. 1-3. The sail 22 is rolled about the control bar longitudinal axis 32 using the techniques discussed above, including simply by manually applying a torque load to the control bar. As discussed above, the sail may also be rolled by adjusting the pitch and/or yaw angle of the sail. It will be appreciated that on a starboard tack, the mast 36 will be positioned to extend diagonally upwardly toward the starboard side of the sailboard rather than toward the port side of the sailboard as shown in FIGS. 1-3. Also, on a starboard tack the sailing system 20 is controlled and maneuvered in the same manner as on a port tack, as discussed above, but of course by conversely operating the struts 26 and 28, the fore stays 74 and 76, the sheeting stays 82 and 84, etc. from the manner discussed above.

For certain types of water or land craft and for certain types of prevailing wind conditions, it may be desirable to construct the sail so that the "lift" coefficient of the struts 26 and 28 differ from that of the anhedral section of the sail. This may be necessary, for instance, if the struts extend only partway from the tips of the anhedral portion of the sail toward the control bar. Also, it may be desirable to construct the anhedral portion of the sail to vary the lift coefficient in the span-wise direction, for instance, to bias the sail to generate either greater lifting forces or greater driving forces. Constructing the sail to achieve different "lift" coefficients may be accomplished by varying the camber ratio of the struts and/or various span-wise sections of the anhedral portion of the sail. This may be achieved, for instance, by changing the curvature of the ribs 60 employed in the construction of the sail. Also, the foregoing can be achieved by the manner in which the skins 52 and 62 of the sail formed (cut and sewn together) so as to produced a desired camber ratio and also a desired chord-wise profile of the sail at various locations along the span of the sail.

It will be appreciated that by the foregoing construction, the sailing system 20 of the present invention can be utilized to achieve a high lifting force that exceeds the combined weight of the sail 22, the sailboard 34 and the sailor thereby lifting the sailboard and the sailor off the land or water to achieve a flying mode. Moreover, due to the unique and efficient construction and shape of the sail 22, high sailing/traveling speeds can be attained before becoming airborne. The momentum and kinetic energy from this high speed travel may be converted to vertical potential energy when the orientation of the sail 22 is changed to generate greater lift to achieve flight. The faster travel speed achievable through the sailing system 20 of the present invention results in a higher level of momentum and kinetic energy available for transformation into vertical potential energy. This results in a longer time of flight than possible with known sailing systems. The faster travel speed also results in an increased hydrodynamic lift on the sailboard 34 and thus a reduced drag induced by the sailboard.

Next referring to FIG. 4, a portion of an alternative preferred sailing system 100 constructed according to the present invention is illustrated. The sailing system 100 is constructed similarly to the sailing system 20, with the components of the sailing system 100 corresponding to the components of the sailing system 20 denominated by the same part number, but with the addition of an "a" designation. Another embodiment, not illustrated, for a sailboard or other type of water craft or land vehicle does not use a mast, but it is to be understood that the sailing system may be employed with various types of water craft and land vehicles in the same manner as the sailing system 20.

Sailing system 100 principally differs from sailing system 20 in that a second anhedral sail section 102 is utilized. The anhedral section 102 is disposed radially inwardly of the outer anhedral section 24a, with the ends of the anhedral section 102 attached to intermediate span-wise locations along the struts 26a and 28a. Ideally, in span-wise curvature the inner anhedral section 102 corresponds to that of the outer anhedral section 24a so that the radially disposed components of the forces generated by the anhedral section 102 also extends through lines of action that intersect at an apex 46a corresponding to the longitudinal axis of the control bar 32a in the same manner in which such radial forces generated by the outer anhedral section 24a extend through the longitudinal axis of the control bar. The shape of the inner anhedral section 102 may be achieved by the use of a span-wise spar 104 similar to the spar 54a utilized in conjunction with the outer anhedral section 24a. In addition, ribs 106 extend chord-wise of the anhedral section 102, which ribs may be either formed in a rigid, curved shape or may be flexible, for maintaining tension on the leading and trailing edges 108 and 110, respectively of the inner anhedral section. An outer skin 112 extends outwardly over the spar 104 and ribs 106 to form the outer surface of the inner anhedral section 102 in curved, chord-wise profile. An inner skin 114 spans between the leading and trailing edges 108 and 110, which inner skin chord-wise may be in a straight line, or may be of a curved profile to enhance the aerodynamic properties of the inner anhedral section, in which instance, additional ribs or some of the ribs 106 may be bowed toward the inner skin 114 to maintain the inner skin in taut condition.

In the chord-wise direction, the second anhedral section 102 may be shorter than the outer anhedral section 24a and/or the struts 26a and 28a thereby to increase the clearance between the leading edge 108 and the fore stays 74a and 76a and the clearance between the trailing edge 110 and the sheeting stays 82a and 84a. If such stays are not utilized, then the second anhedral section may be extended in the chord-wise direction to even beyond the leading and trailing edges 56a and 58a of the struts. Further, stays, not shown, similar to stays 74a, 76a, 82a, and 84a, may be employed in conjunction with the second anhedral section 102.

It will be appreciated that the sail 22a by utilizing the second anhedral section 102 is capable of achieving an increased level of performance than if the second anhedral section were not employed without appreciably increasing the mass and weight of the sailing system 100. Thus, the advantages provided by the sailing system 20, discussed above, are also achieved through the sailing system 100, but with even a higher level of performance.

Another variation of sailing system 100 is the utilization of buoyancy devices at the corners 48a and 50a of the sail 22a. The resulting buoyancy chambers assists in maintaining the sail floating on the water, for instance, when the wind is slack and/or when one of the struts 26a or 28a drops down to the water level. As shown in FIG. 4, the desired buoyancy is achieved by incorporating flotation chambers 116 and 117 at the corners 48a and 50a of the sail. The flotation chambers are disposed inwardly of the corners and are adapted to receive a gas, preferably lighter than air, for example, helium. An appropriate valve 118 may be employed for directing gas into the flotation chambers 116 and 117 and also for expelling the gas from the chambers when desired. As an alternative, the flotation chambers can be filled with very low density foam to provide the desired buoyancy. One advantage of the foam is that a puncture of the chamber would not result in the loss of buoyancy.

FIG. 5 illustrates a further perferred embodiment of the present invention. The sailing system 120 illustrated in FIG. 5 is similar to the sailing system 20 shown in FIGS. 1-3, but with the addition of a trailing canard sail 122 mounted on a control bar 32b aft of the sail 22b. In FIG. 5, the components of the sailing system 120 corresponding to the components of the sailing system 20 shown in FIGS. 1-3 are denoted with the same part number, but with the addition of a "b" designation. Moreover, the components of the canard sail 122 corresponding to the components of the main sail 22b are denoted by corresponding part numbers, but with the addition of a prime, "'", designation. The major purpose of the canard sail 122 is to control the orientation of the main sail 22b by movement of the canard sail, which movement is readily attained in that the canard sail is substantially smaller than the main sail. To this end, the canard sail 122 is mounted on an auxiliary control bar 124 which in turn is mounted on the trailing end of the main control bar 32b by a universal-type joint 126 which permits the auxiliary control bar and thus the canard sail 122 to move in the pitch, roll, and yaw directions relative to the main control bar 32b. From the joint 126, the auxiliary control bar 124 extends along and below the main control bar 32b. A control ring 128 is mounted on the forward end of the auxiliary control bar 124 for manual grasping by the sailor. The control ring 128 encircles the control bar 32b to limit the pitch and yaw movement of the auxiliary control bar 124 and thus the canard sail 122. The universal joint 126 may be constructed to limit the roll angle of the canard sail 122 about the auxiliary control bar 32b.

It will be appreciated that a sailor standing on sailboard 34b may conveniently orient the canard sail 122 by movement of the control ring 128 which in turn causes the desired movement of the main sail 22b. The canard sail may be moved in the pitch, yaw and roll directions in the same manner as sail 22 described above, to achieve a desired orientation of the canard sail 122 and thereby also a desired orientation of the main sail 22b. As with the main sail 22b, the roll movement of the canard sail may be quickly and readily achieved by pitching and/or yawing the canard sail. In essence, constructing the canard sail in substantially the same shape as the main sail 22b results in substantially the same advantages provided by the main sail.

It will be appreciated that the canard sail may be located in front of the main sail 22b rather then behind the main sail. As such the auxiliary control bar would be mounted on the forward end of the control bar 32b.

An additional preferred embodiment 150 of the present invention is illustrated in FIG. 6 employing a sailing system similar to system 20 shown in FIGS. 1-3. Accordingly, the components of the sailing system 150 corresponding to the components of sailing system 20 are denominated by the same part number, but with the addition of a "c" designation.

As shown in FIG. 6, the sail 22c is very similiar in construction to the sail 22 shown in FIGS. 1-3, but with the exception that the anhedral section 24c is composed of a plurality of span-wise arranged panels 152. The panels 152 are separated by chord-wise ribs 60c extending between the leading and trailing edges 56c and 58c, respectively, of the anhedral section 24c. Spar sections 154 extend between adjacent ribs 60c to maintain the ribs in span-wise spaced-apart relationship to each other.

The tips of the anhedral section 24c terminate at sharp corners 48c and 50c at their juncture with the outer ends of struts 26c and 28c, rather than being rounded in the form of corners 48 and 50 shown in FIGS. 1-3. At the corners 48c and 50c of the anhedral section 24c are preferably hinged to the adjacent ends of the struts 26c and 28c by any convenient manner, such as by mechanically hinging the outer ends of the strut spars 156 and 158 to the ribs 60c employed at the corners 48c and 50c or to the ends of the adjacent spars 154. Also, preferably the inward ends of the struts 26c and 28c are detachably connected to the control bar 32c, such as by pins or other types of commonly available hardware. Through the foregoing construction, the sail 22c may be conveniently collapsed by dissembling the inboard ends of the struts 26c and 28c from the control bar 32c and then swinging the struts to a position adjacent the concave bottom surface of the anhedral section 24c to achieve a more compact configuration for transportation or storage.

It will be appreciated that the panels 152 cooperatively define an arcuate shape closely corresponding to the arcuate shape of the anhedral section 24 shown in FIGS. 1-3. Moreover, applicant has found that constructing the anhedral section 24c with the individual panels 152 results in a very rigid but lightweight structure capable of withstanding high level loads without significant distortion of the shape of the anhedral section.

It also will be appreciated that the sailing system 150 may be utilized to generate lift and driving forces in the same manner as the sailing system 20 and thereby provides substantially the same attributes and advantages as provided by the sailing system 20, as discussed above.

Figure 7:
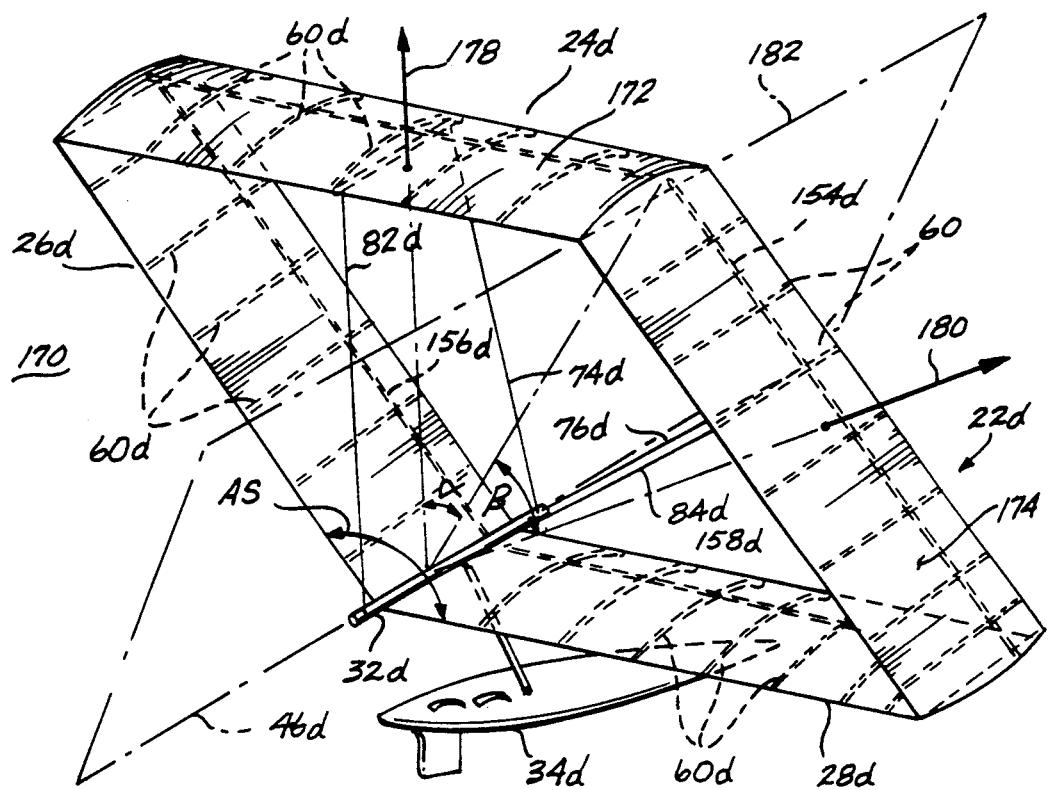
FIG. 7 is a rear isometric view of yet another preferred embodiment of the present invention; and, FIG. 8 is an enlarged, fragmentary, isometric view of a portion of an alternative control system of the present invention.

It is to be understood that the sail 22c may include an anhedral section 24c having a greater or lesser number of span-wise adjacent panels similar to panel 152. For instance, FIG. 7 illustrates yet another preferred embodiment of the present invention wherein a sailing system 170 is constructed similarly to the sailing systems shown in FIGS. 1-6, and especially the sailing system 150 shown in FIG. 6. Accordingly, the components of the sailing system 170 similar to corresponding components of the sailing systems 20, 100, 120, 150 are denominated by the same part number, but with a "d" designation.

The major difference between sailing system 170 and the sailing system 150 is that sailing system 170 employs a sail 22d having an anhedral section 24d composed of two diagonally disposed panels 172 and 174 rather than the larger number of panels 152 employed to form the anhedral section 24c of sail 22c shown in FIG. 6. Preferably, the span-wise lengths of the sail panels 172 and 174 as well as the span-wise lengths of struts 26d and 28d are such that the longitudinal axis 46d defined by the intersection of the struts 26d and 28d is in alignment with the components of the total aerodynamic forces generated by the two panels acting in the direction normal to the plane of the panels 172 and 174, respectively. These force components are represented by arrows 178 and 180 in FIG. 7. As a result, in a manner similar to the sailing systems illustrated in FIGS. 1–6, the "radial" force components 178 and 180 do not tend to generate a torque load about the longitudinal axis 46d.

In one specific embodiment of the present invention shown in FIG. 7, the arc span (AS) extending between the struts 26d and 28d is preferably approximately 120 degrees. As such, the angle $\alpha$ between the line of action of the force component 178, the plane of symmetry 182 (defined by the longitudinal axis 46c and the line of intersection between the panels 172 and 174), is approximately 30 degrees or one-quarter of the total of the arc span AS. Correspondingly, the angle $\beta$ between the line of action of the force component 180 and the plane of symmetry 182 is also approximately 30 degrees or one-quarter of the arc span AS.

Constructing the sail 22d with the foregoing geometric relationships results in a sailing system 170 capable of generating substantial vertical lift when desired while simultaneously generating a high level sail drive force for propelling a water craft or land vehicle at relatively high speeds. Further, the sailing system 170 provides the other advances and advantages, discussed above, provided by the sailing systems 20, 100, 120, and 150. An additional advantage provided by sailing system 170 is that it can be constructed so that the panels 172 and 174 are hingedly attached together at their juncture. Moreover, the struts 26d and 28d may be detachably connected together at the control bar 32d. Thus, upon disassembly of the struts 26d and 28d from each other and from the control bar 32d, the struts may be pivoted relative to the panels 172 and 174 to a position adjacent their corresponding panels and then the panels pivoted about their hinge interconnection to each other to form a very compact, collapsed envelope wherein the sail panels 172 and 174 and the corresponding struts 26d and 28d are essentially all disposed in face-to-face overlapping relationship to each other. To maintain the sail 22d in its operating configuration shown in FIG. 7, the hinge connection between the panels 172 and 174 may be adapted to be locked in "open" position. Similarly, locks can also be used at the hinge joint between the panels 172 and 174 and their corresponding struts 26d and 28d.

Figure 8:
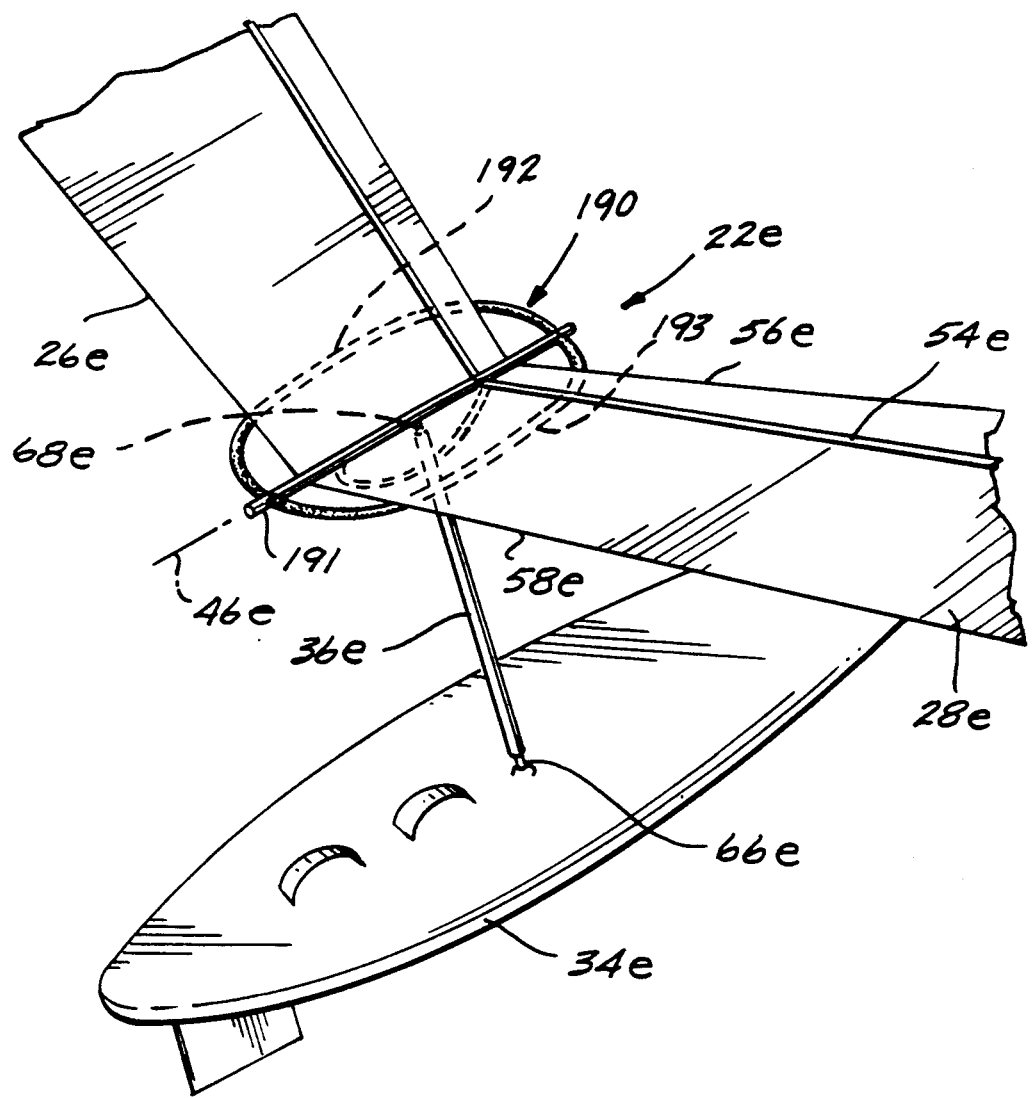

FIG. 8 illustrates an alternative construction for the control bar 32 shown in FIGS. 1–3. The control bar 190 shown in FIG. 8 includes a longitudinal member 191 attached to the struts 26e and 28e in a manner similar to the control bar 32. The control bar 190 includes offset handle members 192 and 193 having longitudinally disposed intermediate portions and forward and rearward end portions to intersect with the forward and rearward ends of the longitudinal member 191. The handles 192 and 193 provide alternative grasping locations for the sailors hands so that the sailor can more readily lean sideways at a desired angle and still position the sail 22e at a desired lateral location relative to the underlying water craft or land vehicle being propelled, not shown. Also, the handles 192 and 193 enable the sailor to impose a torque load on the sail 22e about the apex 46e to counteract torque loads generated by the sail, for instance, when the yaw angle of the sail is altered which causes the strut 26e to generate a moment acting about the apex 46e.

Although the sailing systems 20, 100, 120, 150, and 170 have been described and illustrated in conjunction with a sailboard, it is to be understood that the sailing systems may be utilized in conjunction with other types of water craft and land vehicles. When used in conjunction with a sailboard, such as the sailboard 34 discussed above, generally the control bar and thus the sail will be canted windward of the sailboard. It will be appreciated that the center of the projected radial forces along the span of the sail anhedral section will also lie to the windward side of the sailboard and thus also windward of center the lateral resistance generated by the keel of the sailboard. In this configuration, the sailor utilizing the present invention is positioned as shown in FIGS. 1–3 to lean against the propelling or driving force in the manner of a sailor using a conventional sailboard system or a water skier. As such the sailor is positioned below and in substantial alignment with the intersection of the lines of action of the forces acting span-wise along the anhedral portion of the wing. Thus, during flight neither the sailor nor the sail seek to swing relative to each other as would occur if the sailor were positioned laterally of the sail.

However, in other applications of the present invention, the sail, such as sail 22, may be positioned so that the center of the projected radial forces along the span of the anhedral section lies coincident or in vertical alignment with the center of the lateral resistance generated by, for instance, the keel of a sailboat. In this situation, the sail would not likely be manually supported and positioned in the manner illustrated in the drawings and described above. Rather, the sail would be mounted on an appropriate structure capable of rotating the sail as desired about the pitch, yaw, and roll axes as desired. Such control system could be operated by electrical or fluid power rather than having to rely on the manual efforts of an individual or individuals.

It is to be understood that modifications and variations of the present invention in addition to these set forth above, may be made without departing from the spirit or scope thereof. Accordingly, the present invention is defined by the appended claims rather than being limited to the foregoing sailing systems 20, 100, 120, 150, and 170 described above.

The embodiments of the invention in which an exclusive property or privilege is claimed are defined as follows:

1. A radial force sail for propelling a sailing apparatus, comprising:
   (a) a span-wise extending first anhedral section shaped to define a convex side and a concave side, the first anhedral section capable of generating an upwardly directed aerodynamic force in the wind and a net driving aerodynamic force in the wind;
   (b) substantially rigid strut means interconnecting the tip portions of the first anhedral section to contribute to the structural integrity and stability of the first anhedral section and to provide an upwardly directed aerodynamic force in the wind and a net driving aerodynamic force in the wind whereby the anhedral section is substantially restrained against deflection and in the direction away from and toward the convex and concave sides of the anhedral section; and, (c) means associated with the strut means to vary the orientation of the sail independently in the roll, pitch and yaw directions, thereby to selectivety alter the magnitude of the upwardly directed aerodynamic force and the driving aerodynamic force substantially independently of each other.

2. A radial force sail according to claim 1, wherein the first anhedral section extends along a span-wise continuous arc.

3. A radial force sail according to claim 1, wherein the first anhedral section is composed of a plurality of substantially planar, span-wise adjacent sections cooperatively approximating a continuous arc.

4. A radial force sail according to claim 1, wherein the first anhedral section chord-wise defines a three-dimensional wing profile.

5. A radial force sail according to claim 1, wherein the strut means are substantially coplanar and the planes defined by said strut means extends through or adjacent the center of the projected aerodynamic forces acting span-wise along the first anhedral section of the sail.

6. A radial force sail according to claim 5, wherein the strut means extend through or adjacent the center of the projected aerodynamic forces acting span-wise along the first anhedral section of the sail.

7. A radial force sail according to claim 5, wherein the strut means in the chord-wise direction defines a three dimensional wing profile.

8. A radial force sail according to claim 1, wherein the strut means comprises:
(a) a first strut section connected to one tip portion of the first anhedral section;
(b) a second strut section connected to the other tip portion of the first anhedral section and diagonally disposed relative to the first strut section; and,
(c) means interconnecting the first and second strut sections.

9. A radial force sail according to claim 8, wherein the means to vary the orientation of the sail are interconnected between the first and second strut sections.

10. A radial force sail according to claim 9, wherein the means to vary the orientation of the sail are disposed at approximately the center of the projected aerodynamic forces acting span-wise along the first anhedral section of the sail.

11. A radial force sail according to claim 9, wherein: the first anhedral section of the radial force sail defines a center of curvature; and, the means to vary the orientation of the sail are disposed at substantially the center of curvature of the first anhedral section of the radial force sail.

12. A radial force sail according to claim 8, wherein the first and second strut sections in chord-wise direction define a three-dimensional wing profile.

13. A radial force sail according to claim 1, further comprising corner means for interconnecting the strut means with the end portions of the first anhedral section of the sail, said corner means being arcuate in cross section in the direction span-wise of the sail.

14. A radial force sail according to claim 13, wherein the corner means includes buoyancy means for assisting in maintaining the sail afloat on the water.

15. A radial force sail according to claim 1, wherein the means for varying the orientation of the sail are disposed at approximately the center of the projected aerodynamic forces acting span-wise along the first anhedral section of the sail.

16. A radial force sail according to claim 1, wherein the means for varying the orientation of the sail are disposed at approximately the center of curvature of the first anhedral section of the sail.

17. A radial force sail according to claim 1, wherein the means for varying the orientation of the sail are connected to the strut means.

18. A radial force sail according to claim 17, wherein the means for varying the orientation of the sail are rigidly connected to the strut means.

19. A radial force sail according to claim 17, wherein the means for varying the orientation of the sail are disposed at approximately the center of the projected aerodynamic forces acting span-wise along the first anhedral section of the sail.

20. A radial force sail according to claim 17, wherein the means for varying the orientation of the sail are disposed at approximately the center of curvature of the first anhedral section of the sail.

21. A radial force sail according to claim 17, wherein the means for varying the orientation of the sail includes manually graspable portions.

22. A radial force sail according to claim 21, wherein the manually graspable portions of the means for varying the orientation of the sail extend chord-wise of the strut means.

23. A radial force sail according to claim 1, further comprising stays extending between the first anhedral section of the sail and the strut means.

24. A radial force sail according to claim 1, further comprising stays extending between the first anhedral section of the sail and the means for varying the orientation of the sail.

25. A radial force sail according to claim 1, further comprising a second anhedral section of a size span-wise smaller than the first anhedral section and extending span-wise along the first anhedral section, the second anhedral section having end portions connected to the strut means.

26. A radial force sail according to claim 25, wherein the second anhedral section is chord-wise of and generally aligned with the first anhedral section.

27. A radial force sail according to claim 1, further comprising a second sail disposed chord-wise to and spaced from the sail, said second sail having a second anhedral section having tip portions interconnected to substantially rigid second strut means.

28. A radial force sail according to claim 27, further comprising means for selectively controlling the orientation and rotational movement of the second sail.

29. A radial force sail according to claim 1, further comprising means capable of continuously varying the angle of attack of the first anhedral section of the sail during sailing.

30. A radial force sail according to claim 1, further comprising means for selectively changing the camber ratio of the first anhedral section of the sail during sailing.

31. A sailing system for propelling a vehicle, comprising:
(a) radial force sail having a span-wise extending first anhedral section capable of generating an upwardly directed lifting force and a net propelling force in the wind, and substantially rigid strut means interconnecting the tip portions of the first anhedral section to contribute to the structural integrity and stability of the sail and to provide an upwardly directing lifting force and a net propelling force in the wind;

(b) means for mounting the sail on the vehicle while permitting the orientation of the sail relative to the vehicle to be selectively and independently adjusted about the roll, pitch and yaw axis of the sail; and, (c) control means associated with the strut means to control the orientation of the sail including rotating the sail about the roll, pitch and yaw axes thereby to selectively and significantly vary the magnitude of the upwardly directed lifting force and the propelling force generated by the sail substantially independently of each other.

32. A sailing system according to claim 31, wherein the vehicle includes a water craft.

33. A sailing system according to claim 32, wherein the water craft includes hull for supporting the sailor in a generally upright position; and, wherein the mounting means includes the mast extending upwardly from the hull to interconnect the hull to the sail.

34. The sailing system according to claim 33, further comprising joint means interconnecting the lower end of the mast to the hull and the upper end of the mast to the sail while permitting the mast to be simultaneously tilted longitudinally and transversely relative to the hull and permitting the sail to be rotated relative to the mast about the roll, pitch and yaw directions.

35. The sailing system according to claim 34, wherein the control means includes manually graspable handles fixedly secured to the strut means.

36. The sailing system according to claim 35, wherein the manually graspable handles of the control means are disposed near the center of the projected aerodynamic forces acting span-wise along the first anhedral section of the sail.

37. A sailing system according to claim 31, wherein the first anhedral section extends along a span-wise continuous arc.

38. A sailing system according to claim 31, wherein the first anhedral section is composed of a plurality of substantially planar, span-wise arranged sections cooperatively approximating a continuous arc.

39. A sailing system according to claim 31, wherein the first anhedral section in the chord-wise direction defines a three-dimensional wing profile.

40. The sailing system according to claim 31, wherein the strut means extend through or near the center of the projected aerodynamic forces acting span-wise along the first anhedral section of the sail.

41. A sailing system according to claim 40, wherein the strut means comprises:
(a) a first strut section connected to one tip portion of the first anhedral section;
(b) a second strut section connected to the other tip portion of the first anhedral section and diagonally disposed relative to the first strut section; and
(c) means interconnecting the first and second strut sections.

42. A sailing system according to claim 41, wherein the control means are connected to the first and second strut sections.

43. A sailing system according to claim 42, wherein the control means are disposed at approximately the center of the projected aerodynamic forces acting span-wise along the first anhedral section of the sail.

44. The sailing system according to claim 42, wherein: the first anhedral section of the radial force sail defines a center of curvature; and, the control means are disposed at substantially the center of curvature of the first anhedral section of the sail.

45. The sailing system according to claim 31, wherein the strut means in the chord-wise direction define a three-dimensional wing profile.

46. The sailing system according to claim 31, wherein the tip portions of the anhedral section having buoyancy means for assisting and maintaining the sail afloat on the water.

47. The sailing system according to claim 31, wherein the control means are positioned near the center of the projected aerodynamic forces acting span-wise along the first anhedral section of the sail.

48. A sailing system according to claim 31, wherein: the first anhedral section of the radial force sail defines a center of curvature; and, the control means are disposed near the center of curvature of the first anhedral section of the sail.

49. The sailing system according to claim 31, further comprising stays extending between the first anhedral section of the sail and the control means.

50. A sailing system according to claim 31, wherein the mounting means includes means for moving the radial force sail longitudinally relative to the length of the vehicle while maintaing a substantially constant angle of attack of the radial force sail.

51. A sailing system for propelling a sailboard, comprising:
(a) a radial force sail having:
a span-wise extending first anhedral section shaped to define an inwardly directed concave side and an outwardly directed convex side, the first anhedral section capable of generating substantially independently of each other an upwardly directed lifting force and a net propelling force in the wind; and,
substantially rigid strut means interconnecting the tip portions of the first anhedral section to contribute to the structural integrity and stability of the sail and to provide auxiliary upwardly directed lifting and net propelling forces in the wind;
(b) mast means for mounting the sail on the sailboard while permitting the orientation of the sail in the roll, pitch and yaw directions relative to the sailboard to be selectively and independently adjusted; and,
(c) control means associated with the strut means to control the orientation of the sail including rotating the sail about the roll, pitch and yaw axes selectively and independently about each such axes thereby to selectively vary the magnitude of the upwardly directing lifting force and the propelling force generated by the sail substantially independently of each other.

52. A sailing system according to claim 51, wherein the control means includes manually graspable portions disposed near the center of the projected aerodynamic forces acting span-wise along the first anhedral section of the sail.

53. The sailing system according to claim 52, wherein: the first anhedral section of the radial force sail defines a center of curvature; and, the manually graspable portions of the control means are disposed near the center of curvature of the first anhedral section of the sail.

54. The sailing system according to claim 51, wherein the first anhedral section extends along a span-wise continuous are.

55. The sailing system according to claim 51, wherein the first anhedral section comprises a plurality of substantially planar, span-wise adjacent sections cooperatively approximating a continuous arc.

56. The sailing system according to claim 51, wherein the first anhedral section is substantially rigid in both its convex and concave sides.

57. The sailing system according to claim 51, wherein the first anhedral section in the chord-wise direction defines the three-dimensional wing profile.

58. The sailing system according to claim 51, further comprising stays extending between the first anhedral section of the sail and the control means.

59. A sailing system according to claim 51, wherein the mast means includes means for moving the radial force sail longitudinally relative to the sailboard while substantially maintaining the angle of attack of the radial force sail.

60. A radial force sail propelling a sailing apparatus, comprising:
    (a) a span-wise extending first anhedral section shaped to define an inwardly directed concave side and an outwardly directed convex side, the first anhedral section capable of generating an upwardly directed aerodynamic force in the wind and a net driving aerodynamic force in the wind;
    (b) substantially rigid strut means interconnecting the tip portions of the first anhedral section to contribute to the structural integrity and stability of the first anhedral section and to provide an upwardly directed aerodynamic force in the wind and a net driving aerodynamic force in the wind whereby the anhedral section is substantially rigid in both the convex and concave directions;
    (c) control means associated with the strut means to control the orientation of the sail, thereby to selectively very the magnitude of the upwardly directed force and the driving force generated by the sail substantially independently of each other; and
    (d) the strut means cooperating with the first anhedral section of the sail to maintain the first anhedral section in a configuration that the net aerodynamic forces on the anhedral section intersect at, or approximately at, the location of the control means whereby minimal torque will be developed by the forces acting on the anhedral section tending to roll the sail about the control means.

61. A radial force sail for use in propelling a sailing vehicle, comprising:
    (a) a span-wise extending first anhedral section shaped to define a chordwise extending convex side and a chordwise extending concave side, the first anhedral section capable of generating an upwardly directed aerodynamic force in the wind and a net driving aerodynamic force in the wind;
    (b) substantially rigid strut means interconnecting distal portions of the first anhedral section to contribute to the structural integrity and stability of the first anhedral section and to provide an upwardly directed aerodynamic force in the wind and a net driving aerodynamic force in the wind whereby the anhedral section is substantially restrained against deflection in the directions away from and toward the convex and concave sides of the anhedral section; and,
    (c) control means associated with the strut means to vary the orientation of the sail in the roll, pitch and yaw directions, thereby to selectively alter the magnitude of the upwardly directed aerodynamic force and the driving aerodynamic force substantially independently of each other.

62. A radial force sail according to claim 61, wherein the control means are disposed at approximately the center of the projected aerodynamic forces acting span-wise along the first anhedral section of the sail.

63. A radial force sail according to claim 61, wherein the control means are connected to the strut means.

64. A radial force sail according to claim 61, wherein the control means includes means for individually varying the orientation of the sail in the roll, pitch and yaw directions.

65. A radial force sail according to claim 64, wherein the control means includes means for independently varying the orientation of the sail in the roll, pitch and yaw directions.

* * * * *